UNITED STATES PATENT OFFICE.

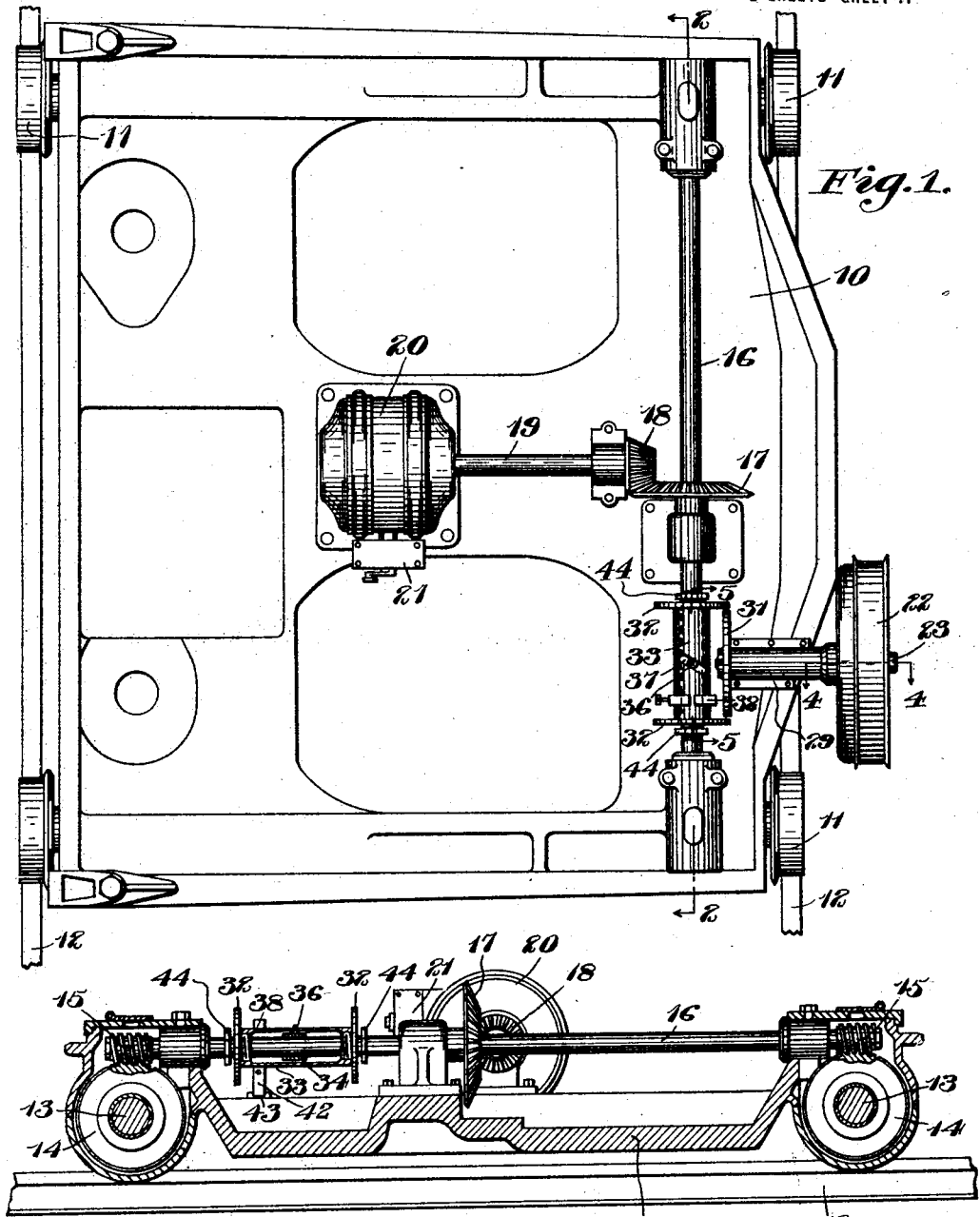

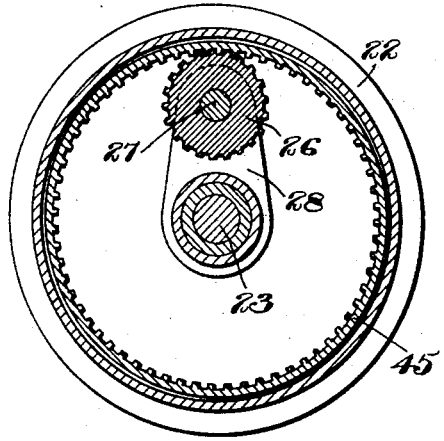
Fig. 3.
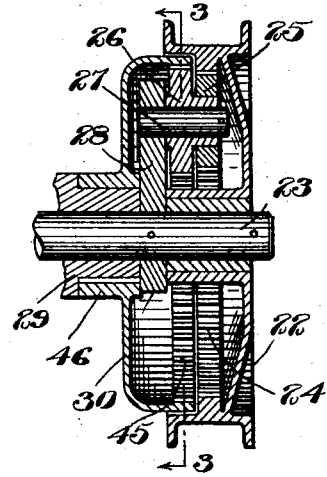
Fig. 4.
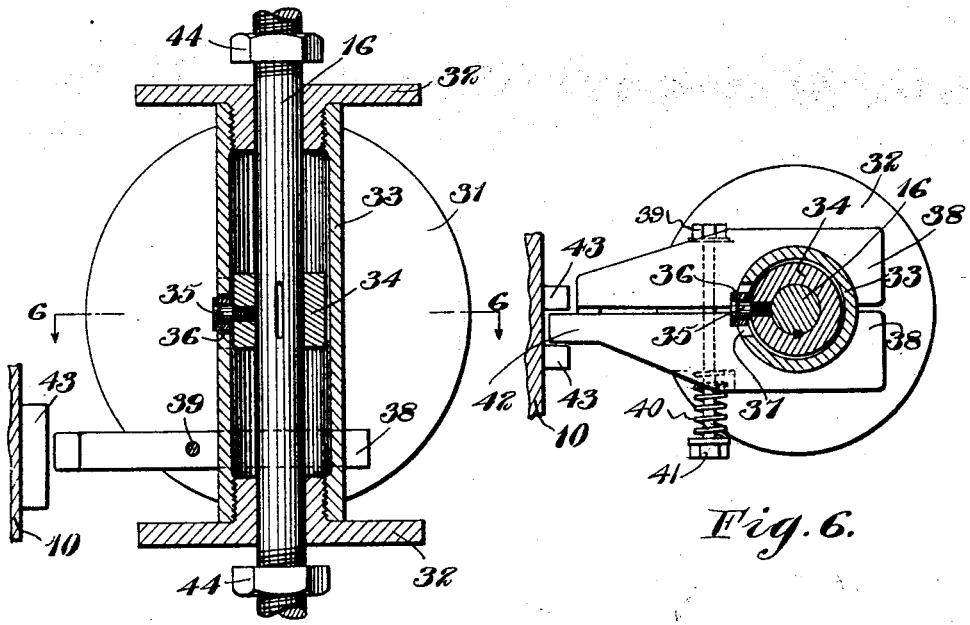
Fig. 5.
Fig. 6.

HENRY H. MERCER, OF CLAREMONT, NEW HAMPSHIRE, ASSIGNOR TO SULLIVAN MACHINERY COMPANY, A CORPORATION OF MASSACHUSETTS.

REEL-DRIVING MECHANISM.

1,409,896. Specification of Letters Patent. Patented Mar. 14, 1922.

Application filed April 18, 1918. Serial No. 229,383.

*To all whom it may concern:*

Be it known that I, HENRY H. MERCER, a citizen of the United States, residing at Claremont, in the county of Sullivan and State of New Hampshire, have invented certain new and useful Improvements in Reel-Driving Mechanism, of which the following is a full, clear, and exact specification.

This invention relates to mechanism for handling flexible conductors or the like for transmitting or conveying electric current or motive or other fluid to moving machines. For convenience the invention is herein illustrated as applied to an electric stone channeling machine comprising a wheeled truck adapted to be propelled over the quarry floor or other surface to be cut by means of an electric motor. In such machines current is usually supplied to the motor by means of a flexible conductor or cable leading from a suitable source of electric energy, and of a suitable length to reach the machine in any position of the latter. When such a cable is employed, it is desirable that means be provided for taking the same up and paying it out, in accordance with the movements of the truck, in order to prevent injury thereto or interference thereby with the proper operation of the machine. In other traveling machines of this and other types operated by other than electric power, similar flexible conductors, requiring similar provision, are employed. For example, in the case of a fluid pressure actuated machine the conductor may be a flexible tube for conducting compressed air, or, in the case of a steam driven machine, said conductor may be a hose for supplying water to the boiler. It will also be understood that such a flexible conductor may be employed for conveying, to a moving machine, something other than motive fluid or current. For example, in the case of a channeling or other stone working machine, it may be desirable to provide a hose for supplying water or cleansing fluid to the cutting appliances.

For the purpose of handling such a conductor, hose, or the like, it is usually customary to employ a reel or winding drum operatively connected with the machine in such a manner as to wind up the conductor when the machine is traveling in one direction and to unwind the same when the machine is traveling in the opposite direction. In order to compensate for irregularities, and also to apply a suitable tension to the conductor as the same is being taken up, thereby preventing slack in said conductor, said reel or drum is usually actuated by means of yielding or frictional driving connections from a source of power tending to draw in upon the conductor at a speed a little faster than the speed of travel of the machine, the excess movement being compensated for by slipping of the driving connections. When, however, the direction of travel of the machine is reversed, causing the reel or drum to pay out the conductor, this excess driving speed causes the conductor to be unwound faster than required by the movement of the machine, and results in the formation of slack which it is the object of the mechanism to avoid.

The present invention has for its general object to provide improved winding mechanism whereby a flexible conductor of the character referred to may be taken in or drawn off in accordance with the travel of the machine in such a manner as to maintain said conductor under a suitable tension to prevent slack therein, said mechanism receiving its power from the machine and performing its intended function irrespective of the direction of travel of said machine.

The foregoing and other more particular objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise embodied and applied without departing from the spirit and scope thereof.

In said drawings,—

Fig. 1 is a plan view of a channeling machine truck having the invention applied thereto.

Fig. 2 is a longitudinal vertical section on the line 2—2, Fig. 1.

Fig. 3 is an enlarged sectional view, taken substantially on the line 3—3, Fig. 4, of the planetary gearing for rotating the winding drum or reel.

Fig. 4 is an enlarged detail section on the line 4—4, Fig. 1.

Fig. 5 is an enlarged detail section on the line 5—5, Fig. 1.

Fig. 6 is a section on the line 6—6, Fig. 5.

As shown in Figs. 1 and 2 of the drawings, 10 denotes a truck body mounted on wheels 11 adapted to run on tracks 12. The wheels 11 are mounted on axles 13 provided with worm gears 14 cooperating with worms 15 on a propelling or driving shaft 16 extending longitudinally of the truck and journaled in suitable bearings thereon. Fast on the shaft 16 is a beveled gear 17 which meshes with a beveled gear 18 on a transverse shaft 19 also journaled in suitable bearings on the truck 10. The shaft 19 is rotated in either direction by a reversible electric motor 20 having a suitable controller 21 and supplied with current by a flexible conductor or cable carried by a winding drum or reel 22. Said conductor or cable and the electrical connections to the motor 20 are not shown herein, being well known in the art.

The winding drum or reel 22 is loosely mounted on a short transverse shaft 23 journaled in a bracket 29 on the truck body 10. Said drum or reel is hollow and is formed with internal gear teeth 24 which mesh with the teeth on a pinion 25 fast on the hub of a pinion 26 rotatably mounted on a stud 27 carried by an arm 28 fast on the shaft 23. Cooperating with the pinion 26 is a fixed internal gear 45 carried by a disk 30 having a hub 46 suitably secured to the bracket 29. The pinions 25 and 26 are of different sizes, as are also the internal gears 24 and 45, and the ratio of the teeth on the pinion 25 to the teeth on the gear 24 is different from the ratio of the teeth on the pinion 26 to the teeth on the gear 45. This mechanism, therefore, constitutes a well known form of planetary gearing whereby the drum or reel 22 is rotated from the shaft 23 at a considerably reduced speed.

Fast on the shaft 23 is a friction gear or disk 31 cooperating with a pair of friction disks 32 located at opposite sides thereof. The disks 32 are formed with hubs loosely mounted on the shaft 16 and connected by a sleeve 33 surrounding said shaft, the distance between said disks, determined by the length of said sleeve, being slightly greater than the diameter of the disk 31. Keyed or otherwise secured to the shaft 16 within the sleeve 33 is a collar 34 having a radially extending stud 35 provided with a roller 36 which engages a short spiral or inclined slot 37 in the sleeve 33. By the foregoing construction it will be seen that the sleeve 33 is permitted a slight combined longitudinal and angular movement upon the shaft 16, the amount of such movement being limited by suitable stops 44. This longitudinal movement is sufficient to engage either of the disks 32 with the disk 31, thereby causing rotation of the shaft 23 in one direction or the other with respect to the direction of rotation of the shaft 16. The sleeve 33 is yieldingly held against rotation by means of a frictional clamping device 38 comprising two clamping members connected by a bolt 39, said members being yieldingly pressed toward one another and toward the sleeve 33 by means of a spring 40 interposed between a nut 41 on the bolt 39 and one of the clamping members, said last mentioned clamping member having an extension 42 which is received between lugs 43 on the truck frame, whereby said clamping device is held against rotation with the shaft 16. At opposite ends of the sleeve 33 beyond the friction disks 32, the shaft 16 is provided with threaded portions to receive stop nuts 44 independently adjustable to limit the longitudinal movement of the sleeve 33 in both directions or to prevent such movement in either direction from the central or neutral position in which both of the disks 32 are out of engagement with the disk 31.

The operation of the mechanism above described is as follows: Rotation of the shaft 16 in one direction or the other causes the roller 36, by engagement with the slot 37 in the sleeve 33, first to move said sleeve 33 longitudinally in one direction or the other, and thereafter to cause said sleeve to rotate with said shaft, the sleeve being momentarily held against rotation by the friction clamp 38 in order to insure its longitudinal movement by the roller 36. Such longitudinal movement of the sleeve 33 causes one or the other of the disks 32 (depending upon the direction of rotation of the shaft 16) to be moved into driving engagement with the disk 31, thereby rotating the shaft 23 and the winding drum or reel. The slot 37 is preferably of a sufficient length to permit a disk 32 to engage the disk 31 before the roller 36 reaches the end of said slot, so that the rotation of the shaft 16 is transmitted to the sleeve 33 and disk 32 through the pressure of said roller against an inclined wall of said slot, which pressure, it will be seen, has a longitudinal component acting to force the disk 32 into engagement with the disk 31 with the requisite driving pressure. Should the direction of rotation of the shaft 16 be reversed, the roller 36 will act through the slot 37 to move the sleeve 33 longitudinally to bring the other disk 32 into engagement with the disk 31, thereby rotating the shaft 23 and drum 22 in the opposite direction with respect to the shaft 16. Since, however, the direction of rotation of the shaft 16 has been reversed, the direction of rotation of the shaft 23 and drum 22 will remain the same.

From the foregoing, it will be seen that, so long as the shaft 16 is rotated to propel the truck, a force will be yieldingly or frictionally transmitted to the drum or reel 22 tending to rotate said reel in the same direction irrespective of the direction of rotation of the shaft 16, thereby tending to wind up the conductor or cable on said reel. The parts are preferably so designed as to cause a speed of rotation of the reel 22 sufficient to draw in upon the cable at a speed slightly greater than the speed of travel of the truck when the machine is traveling in a direction requiring winding up of the cable, thereby maintaining a suitable tension on the cable, the excess speed being compensated for by slipping of the frictional gearing. When the machine is traveling in a direction requiring unwinding of the cable, and consequent turning of the reel in the opposite direction, the frictional gearing will still tend to turn said reel in the direction to wind up the cable, but will slip to permit the same to turn in the opposite direction, so that said cable will be drawn off under a tension provided by said tendency of the reel to reverse rotation. If desired, when the machine is moving in a direction requiring withdrawal of the cable, the friction mechanism may be rendered inoperative by adjusting the appropriate nut 44 into a position to prevent a sufficient longitudinal movement of the sleeve 33 to engage the proper disk 32 with the disk 31, the inertia of the planetary gearing being utilized to apply the desired tension to the cable.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. In an apparatus of the character described, the combination with winding means movable along a predetermined path, of reversible actuating means, and reversible driving connections between said actuating means and winding means, said connections being controlled by the direction of movement of said actuating means, and said winding means being rotated in one direction at a greater peripheral velocity than the linear velocity of said winding means along said path.

2. The combination with a truck adapted to be reciprocated over a predetermined path, of a truck driving shaft, means for rotating said shaft in either direction, a driven winding drum, and reversible transmission gearing for operatively connecting said shaft and drum, said gearing being automatically shifted by reversal of the direction of rotation of said driving shaft.

3. In an apparatus of the character described, the combination with a driving shaft and means for rotating said shaft in either direction, of a driven shaft arranged transverse to said driving shaft, a gear on said driven shaft, a pair of gears on said driving shaft, and means controlled by the direction of rotation of said driving shaft for engaging either of said last named gears with said first named gear.

4. In an apparatus of the character described, the combination with a driving shaft and means for rotating said shaft in either direction, of a driven shaft arranged transversely to said driving shaft, a sleeve on said driving shaft, means connecting said driving shaft and sleeve for moving said sleeve on said shaft in one direction or the other when the direction of rotation of said shaft is reversed, and means controlled by the position of said sleeve for operatively connecting said driving and driven shafts.

5. In an apparatus of the character described, the combination with a driving shaft and means for rotating said shaft in either direction, of a driven shaft, a sleeve longitudinally movable on said driving shaft and having a limited angular movement thereon, means connecting said driving shaft and sleeve, and operated by relative angular movement of said sleeve and shaft in one direction or the other, for moving said sleeve longitudinally in one direction or the other, a gear on said driven shaft, and a pair of gears on said sleeve adapted alternatively to engage said first named gear according to the longitudinal position of said sleeve.

6. In an apparatus of the character described, the combination with a driving shaft and means for rotating the same in either direction, of a driven shaft arranged transversely to said driving shaft, a sleeve longitudinally and angularly movable on said driving shaft, said sleeve having an inclined slot, a roller on said driving shaft engaging said slot, and means controlled by the position of said sleeve for actuating said driven shaft.

7. In an apparatus of the character described, the combination with a driving shaft and means for rotating the same in either direction, of a driven shaft, a sleeve longitudinally movable on said driving shaft and having an angular movement thereon, means connecting said driving shaft and sleeve and operated by relative angular movement of said parts for moving said sleeve longitudinally, means for yieldingly holding said sleeve against rotation, and reversing actuating means for said driven shaft carried by said sleeve and controlled by the longitudinal position thereof.

8. In an apparatus of the character described, the combination with a driving shaft and means for rotating the same in either direction, of a driven shaft, a sleeve longitudinally movable on said driven shaft and having an angular movement thereon, means connecting said driving shaft and sleeve and operated by relative angular movement of said parts for moving said sleeve longitudinally, a clamp frictionally engaging said sleeve for yieldingly holding the same against rotation, and reversing actuating means for said driven shaft carried by said sleeve and controlled by the longitudinal position thereof.

9. In an apparatus of the character described, the combination with a driving shaft and means for rotating said shaft in either direction, of a driven shaft arranged transversely to said driving shaft, frictional gearing connecting said shafts, and means for causing said frictional gearing to rotate said driven shaft in the same direction irrespective of the direction of rotation of said driving shaft.

10. In an apparatus of the character described, the combination with winding means, of reversible actuating means, frictional gearing connecting said actuating means and winding means and including a pair of alternatively operative friction gears, and means controlled by the direction of movement of said actuating means for rendering one or the other of said gears operative.

11. In an apparatus of the character described including a truck, the combination with a truck driving shaft and means for rotating said shaft in either direction, of a driven shaft, frictional gearing connecting said shafts and including a pair of alternatively operative friction gears, and means controlled by the direction of rotation of said driving shaft for rendering one or the other of said gears operative.

12. In an apparatus of the character described, the combination with a driving shaft and means for rotating said shaft in either direction, of a driven shaft, a sleeve longitudinally movable on said driving shaft and having a limited angular movement thereon, means connecting said driving shaft and sleeve and operated by relative angular movement of said sleeve and shaft in one direction or the other from moving said sleeve longitudinally in one direction or the other, a friction disk on said driven shaft, and a pair of friction disks on said sleeve adapted alternatively to engage said first named disk according to the longitudinal position of said sleeve.

13. In an apparatus of the character described, the combination with a driving shaft and means for rotating said shaft in either direction, of a driven shaft, a friction gear on said driven shaft, a pair of friction gears on said driving shaft, and means controlled by the direction of rotation of said driving shaft for engaging one or the other of said last named gears with said first named gear.

14. In an apparatus of the character described, the combination with a driving shaft and means for rotating said shaft in either direction, of a driven shaft arranged transverse to said driving shaft, a friction disk on said driven shaft, a pair of friction disks on said driving shaft, and means controlled by the direction of rotation of said driving shaft for engaging one or the other of said last named disks with said first named disk.

15. In an apparatus of the character described, the combination with a driving shaft and means for rotating the same in either direction, of a driven shaft arranged transverse to said driving shaft, a friction disk on said driven shaft, a pair of friction disks on said driving shaft at opposite sides of said first named friction disk, and means operated by reversal of the direction of rotation of said driving shaft for engaging said last named disks alternatively with said first named disk.

16. In an apparatus of the character described, in combination, a reel, reversible actuating means, planetary gearing for rotating said reel, and means for driving said planetary gearing from said actuating means in the same direction irrespective of the direction of movement of said actuating means.

17. In an apparatus of the character described, in combination, a reel, reversible actuating means, planetary gearing for rotating said reel, and reversible driving connections between said actuating means and planetary gearing, said connections being controlled by the direction of movement of said actuating means.

18. In an apparatus of the character described, in combination, a reel, reversible actuating means, planetary gearing for rotating said reel, and yielding driving connections between said actuating means and planetary gearing for operating the latter in the same direction irrespective of the direction of movement of the former.

19. In an apparatus of the character described, in combination, a reel, a driving shaft, means for rotating said shaft in either direction, a driven shaft, planetary gearing connecting said driven shaft and reel, a friction gear on said driven shaft, a pair of friction gears on said driving shaft, and means controlled by the direction of rotation of said driving shaft for engaging one or the other of said last named gears with said first named gear.

20. In an apparatus of the character described, in combination, a reel, reversible actuating means, planetary gearing for rotating said reel, means for driving said planetary gearing from said actuating means in the same direction irrespective of the direction of movement of said actuating means, and means operable to render said last named means inoperative when said actuating means moves in one direction.

21. In an apparatus of the character described, the combination with a driving shaft and means for rotating the same in either direction, of a driven shaft, a sleeve on said driving shaft, means connecting said driving shaft and sleeve for moving said sleeve longitudinally on said shaft in one direction or the other when the direction of rotation of said shaft is reversed, means controlled by the position of said sleeve for operatively connecting said driving and driven shafts, and devices operable to prevent longitudinal movement of said sleeve in either direction.

22. In an apparatus of the character described, the combination with a driving shaft and means for rotating the same in either direction, of a driven shaft, a sleeve on said driving shaft, means connecting said driving shaft and sleeve for moving said sleeve longitudinally on said shaft in one direction or the other when the direction of rotation of said shaft is reversed, means controlled by the position of said sleeve for operatively connecting said driving and driven shafts, and independently adjustable stops on said shaft at opposite ends respectively of said sleeve for arresting the longitudinal movement thereof.

23. In an apparatus of the character described, the combination with a driving shaft and means for rotating the same in either direction, of a driven shaft, a sleeve on said driving shaft, means connecting said driving shaft and sleeve for moving said sleeve longitudinally on said shaft in one direction or the other when the direction of rotation of said shaft is reversed, reversible frictional gearing controlled by the opposite movements of said sleeve for operatively connecting said driving and driven shafts, and devices operable to prevent longitudinal movement of said sleeve in either direction.

24. In an apparatus of the character described, the combination with a driving shaft and means for rotating the same in either direction, of a driven shaft, a sleeve on said driving shaft, means connecting said driving shaft and sleeve for moving said sleeve longitudinally on said shaft in one direction or the other when the direction of rotation of said shaft is reversed, means controlled by the position of said sleeve for operatively connecting said driving and driven shafts, and nuts in threaded engagement with said driving shaft adapted to engage the opposite ends respectively of said sleeve for arresting the longitudinal movement thereof.

25. In an apparatus of the character described, in combination, a truck, a driving shaft and connections for propelling said truck in either direction, a driven shaft, winding means on said truck operated by said driven shaft, a friction gear on said driven shaft, a pair of friction gears on said driving shaft, and means controlled by the direction of rotation of said driving shaft for engaging one or the other of said last named gears with said first named gear.

26. In an apparatus of the character described, in combination, a truck having an axle, a reversible motor on said truck, a shaft rotated by said motor, worm gearing connecting said shaft and axle, a reel on said truck, and means connecting said shaft and reel for rotating the latter in the same direction irrespective of the direction of rotation of the former.

27. A channeling machine comprising, in combination, a truck, a reversible motor on said truck, means actuated by said motor for propelling said truck in either direction, winding means on said truck, and means connecting said propelling means and winding means for operating the latter in the same direction irrespective of the direction of movement of said truck.

28. In an apparatus of the character described, in combination, a truck, reversible means for propelling said truck in either direction, a reel, planetary gearing for rotating said reel, and driving connections between said propelling means and planetary gearing, said connections having provision for rendering the same inoperative when said truck moves in one direction.

29. In an apparatus of the character described, in combination, a truck, reversible means for propelling said truck in either direction, a reel, planetary gearing for rotating said reel, and frictional driving connections between said propelling means and planetary gearing, said connections having provision for rendering the same inoperative when said truck moves in one direction.

30. In combination, a truck, means for driving said truck in opposite directions including a motor, a reel carried by said truck, a reel driving member, and means driven by said truck driving means for rotating said reel always in the same direction irrespective of the direction of movement of the truck, said means including a pair of reel driving members driven directly and together by said truck driving means and selectively automatically cooperating directly with said first mentioned reel driving member to drive the latter dependent upon the direction of rotation of the truck driving means.

31. In combination, a truck, means for driving said truck in opposite directions including a motor, a reel carried by said truck and driven by said truck driving means, means including a reversing gearing for causing said reel to rotate in the same direction irrespective of the direction of movement of said truck, and friction means for automatically effecting operation of said reversing gearing.

32. In combination, a truck, means for driving said truck in opposite directions including a reversely rotatable shaft disposed parallel to the line of movement of the truck, a reel carried by said truck and rotatable about an axis transverse to the truck, and means for effecting unidirectional reel driving including automatically operative reverse gearing connecting said shaft and reel.

33. In an apparatus of the character described, in combination, a truck, means for driving said truck in opposite directions including a reversely rotatable shaft, a member rotatable in the same direction as said shaft, a plurality of members simultaneously driven by said last mentioned member and movable in opposite directions thereby longitudinally of said shaft, and a reel having a driving member alternately engaged by one of said plurality of members.

34. In an apparatus of the character described, in combination, a truck, means for driving said truck in opposite directions including a reversely rotatable shaft, a reel drum carried by said truck, and driving means for said reel driven by said shaft operative to effect unidirectional rotation of said reel and comprising a shiftable member operative in opposite positions to cause transmission of the reverse rotation of said shaft to said reel in the same direction, and friction means for automatically causing movement of said member to said positions.

In testimony whereof I affix my signature.

HENRY H. MERCER.